United States Patent [19]
Kikuchi

[11] 3,964,503
[45] June 22, 1976

[54] CARBURETOR

[75] Inventor: Kunio Kikuchi, Odawara, Japan

[73] Assignee: Mikuni Kogyo Kabushiki Kaisha, Tokyo, Japan

[22] Filed: July 2, 1975

[21] Appl. No.: 592,654

[30] Foreign Application Priority Data
July 6, 1974 Japan.............................. 49-79263

[52] U.S. Cl. ........................... 137/39; 123/198 DB; 261/DIG. 67; 261/70; 180/104
[51] Int. Cl.²......................................... F16K 17/36
[58] Field of Search .............. 123/198 DB; 180/104; 137/38, 39, 43; 261/70, DIG. 67

[56] References Cited
UNITED STATES PATENTS

| 2,847,021 | 8/1958 | Carlson | 137/39 |
|---|---|---|---|
| 3,059,661 | 10/1962 | Benmore | 137/39 |
| 3,765,435 | 10/1973 | Schlanzky | 137/39 |

*Primary Examiner*—Robert G. Nilson
*Attorney, Agent, or Firm*—Cushman, Darby & Cushman

[57] ABSTRACT

A carburetor provided with a rocking member which will be able to forcibly move a needle valve to a valve closing position through a float when a carburetor body inclines by an angle larger than a predetermined angle from a normal position, in order to prevent the overflow of a fuel caused by continuously flowing into the float chamber from a fuel tank when the carburetor body inclines extremely.

9 Claims, 4 Drawing Figures

CARBURETOR

BACKGROUND OF THE INVENTION

1. Field of the Invention

The present invention relates to carburetors, and more particularly to improvements in a carburetor of a type provided with a float chamber.

2. Description of the Prior Art

Generally, in a carburetor of a type provided with a float chamber, a fuel inflow port to a float chamber is opened and closed by a needle valve moved by a float floated in said float chamber and therefore, when the carburetor inclines by an angle larger than a predetermined angle from a normal position as when the car tumbles, the fuel inflow port will remain open and, as a result, a fuel will continuously flow into the float chamber from the fuel tank. Therefore, the fuel will overflow from the float chamber, will leak out of the carburetor and will cause fire and other disasters.

SUMMARY OF THE INVENTION

Therefore, a primary object of the present invention is to provide a carburetor wherein, when a carburetor body inclines by an angle larger than a predetermined angle from a normal position, a needle valve will be forcibly moved to a valve closing position so that the inflow of a fuel into a float chamber may be automatically stopped.

Another object of the present invention is to provide a carburetor wherein the action of forcibly closing a fuel inflow port to a float chamber can be made positively and quickly.

A still another object of the present invention is to provide a carburetor wherein a fuel inflow port to a float chamber can be forcibly closed by only slightly amending a float chamber of a conventional structure and adding few parts to the float chamber.

These and other objects of the present invention will become more apparent during the course of the following detailed description and appended claims.

DESCRIPTION OF THE PREFERRED EMBODIMENTS

Figure 1:
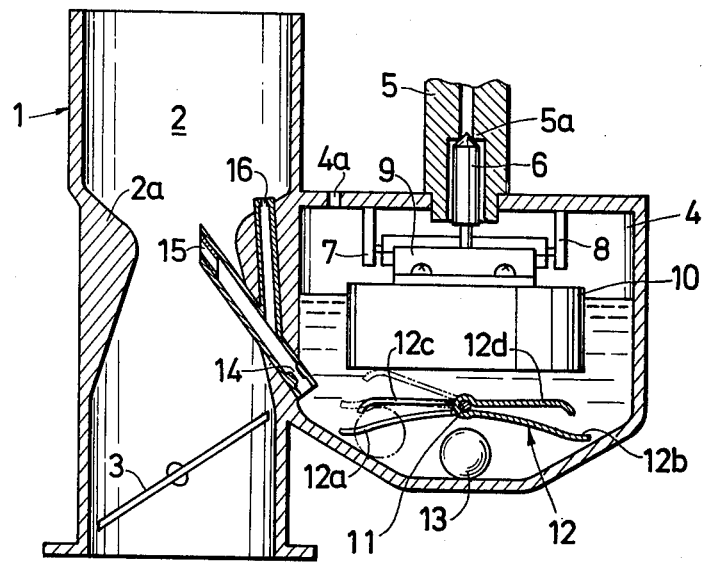
FIG. 1 is a schematic sectional view of an embodiment of a carburetor according to the present invention.
Figure 2:
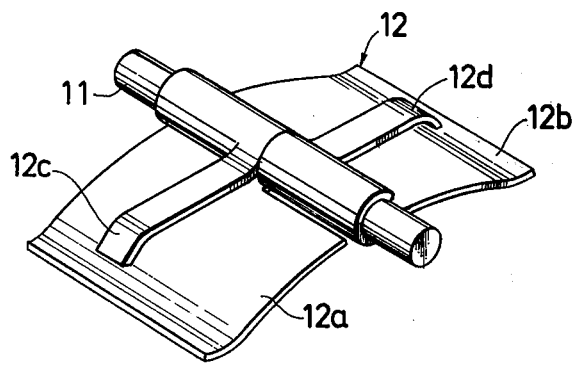
FIG. 2 is a perspective view showing an example of a structure of a rocking member.

FIG. 1 schematically shows an entire carburetor according to the present invention. Reference numeral 1 indicates a carburetor body having a suction bore 2 forming a venturi portion 2a. Numeral 3 indicates a throttle valve. Numeral 4 indicates a float chamber formed integrally with the carburetor body 1, having an air vent 4a in the upper part and formed to be U-shaped as seen in the longitudinal direction of the car in the bottom part. The air vent 4a communicates with the atmosphere or the suction bore 2 on the upstream side of the venturi portion 2a. Numeral 5 indicates a fuel inflow pipe connected with the upper wall of the float chamber 4, having a valve seat part 5a and connected with a fuel tank not illustrated. Numeral 6 indicates a needle valve which can prevent the inflow of fuel into the float chamber 4 by being seated on the valve seat part 5a. Numerals 7 and 8 indicate brackets integral with the upper wall of the float chamber 4. Numeral 9 indicates a float arm supported rotatably in the base part by said brackets 7 and 8 between them, secured in the forward end part to the float 10 and contacted on the upper surface of the middle part with the lower end of the needle valve 6. Numeral 11 indicates a supporting shaft fitted between walls on the opposite sides of said float chamber 4 in the bottom part of the float chamber 4. Numeral 12 indicates a rocking member rotatably mounted on the supporting shaft 11 and, for example, as shown in detail in FIG. 2, comprising plate-shaped portions 12a and 12b in contact in the free ends with the bottom surface of the float chamber 4 and lever portions 12c and 12d formed integrally with said plate-shaped portions 12a and 12b, respectively, and arranged so as to be able to push up said float 10 while in contact with the bottom surface of the float when the plate-shaped portions 12a and 12b are rocked separately around the supporting shaft 11. That is to say, the plate-shaped portions 12a and 12b are so formed as to be able to rock around the supporting shaft 11 separately with the lever portions 12c and 12d, respectively. Numeral 13 indicates a steel ball contained in the float chamber 4 so as to roll on the bottom surface of the float chamber 4 to rotate the plate-shaped portion 12a or 12b of the rocking member 12 around the supporting shaft 11 when the carburetor body 1 or float chamber 4 inclines. Numeral 14 indicates a main jet. Numeral 15 indicates a main nozzle. Numeral 16 indicates a main air jet.

As the carburetor of the present invention is formed as mentioned above, when the carburetor body 1 or float chamber 4 is in a normal position or somewhat inclined position, in response to the vertical movement of the float 10, the needle valve 6 will open or close the fuel inflow port as well known to keep the liquid level position within the float chamber 4 constant but, when the float chamber 4 inclines so abnormally that the angle of inclination exceeds a predetermined value, the steel ball 13 will roll on the bottom surface of the float chamber 4 to move, for example, to the chain-lined position in FIG. 1, therefore the plate-shaped portion 12a and lever portion 12c will be rotated clockwise to the chain-lined positions and the float 10 will be pushed up by the lver portion 12c. Therefore, the needle valve 6 will be forcibly pushed against the valve seat part 5a of the fuel inflow pipe 5 to interrupt the inflow of the fuel into the float chamber 4. This action will be the same even when the float chamber 4 inclines abnormally in the direction reverse to that in the above described case.

Figure 4:
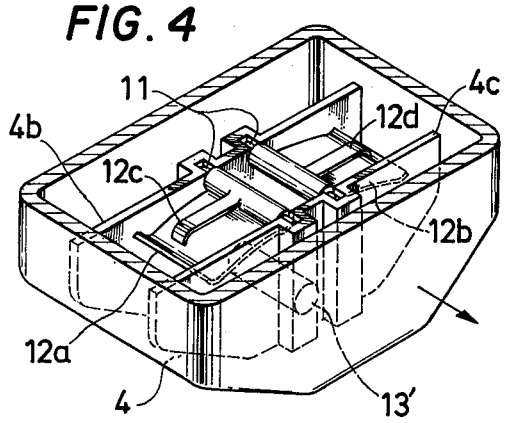
FIG. 4 is a perspective view of an essential part showing still another embodiment of the present invention.
Figure 3:
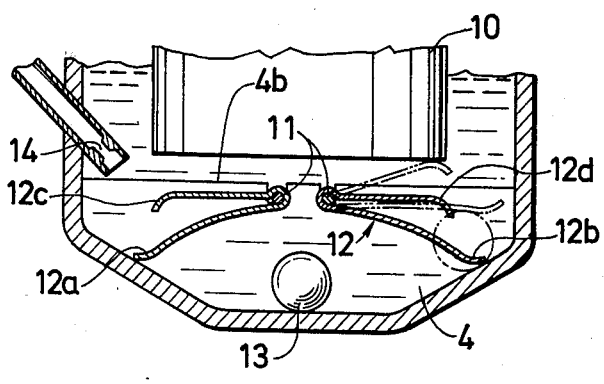
FIG. 3 is a sectioned view of an essential part showing another embodiment of the present invention.

FIGS. 3 and 4 show another embodiment of the rocking member 12. According to this embodiment, two supporting shafts 11 are parallelly provided between opposite partition walls 4b and 4c formed in the float chamber 4 and the plate-shaped portion 12a and lever portion 12c and the plate-shaped portion 12b and lever portion 12d are rotatably fitted to the respective supporting shafts 11, respectively. The embodiment of FIG. 4 is different from that of FIG. 3 in that a steel roller 13' instead of the steel ball 13 in FIG. 3 is housed in the space defined by the partition walls 4b and 4c. An arrow in FIG. 4 shows the progressive direction of the car or the longitudinal direction of the car.

As described above, according to the present invention, when the car tumbles and the carburetor body inclines over a predetermined value, the needle valve 6 will be forcibly held closed through the rocking member 12 and float 10 by the weight of the steel ball, therefore the inflow of the fuel into the float chamber will be positively interrupted and the danger accompanying the leakage of the fuel by overflowing will be able to be prevented.

I claim:

1. A carburetor comprising a float chamber formed to be U-shaped as seen in the longitudinal direction of the car on the bottom surface, a float floatably contained in said float chamber, a needle valve capable of opening and closing a fuel inflow port to said float chamber in association with the movement of said float, a rocking member rockably arranged in said float chamber and capable of contacting the lower surface of said float, and a ball capable of rolling on the bottom surface of said float chamber to rotate said rocking member, said float being pushed up by said rocking member rotated by said ball and said fuel inflow port being thereby forcibly closed with said needle valve when said float chamber inclines by an angle larger than a predetermined angle from its normal position.

2. A carburetor according to claim 1 wherein said ball is made of steel.

3. A carburetor according to claim 1 wherein said rocking member comprises plate-shaped portions capable of contacting the bottom surface of said float chamber and lever portions capable of contacting the lower surface of said float.

4. A carburetor according to claim 1 wherein said rocking member comprises a pair of plate-shaped portion rotatably mounted on a single supporting shaft extending across said float chamber, and a pair of lever portion integral with the respective plate-shaped portions, said pairs of plate-shaped portions and lever portions being arranged symmetrically with said supporting shaft, said plate-shaped portions being able to contact the bottom surface of said float chamber and said lever portions being able to contact the lower surface of said float.

5. A carburetor according to claim 1 wherein said rocking member comprises a pair of plate-shaped portions rotatably mounted respectively on a pair of supporting shafts extending parallelly across said float chamber and extending respectively in opposite directions, and a pair of lever portions integral with said respective plate-shaped portions and extending respectively in opposite directions, said plate-shaped portions being able to contact the bottom surface of said float chamber and said lever portions being able to contact the lower surface of said float.

6. A carburetor comprising a float chamber formed to be U-shaped as seen in the longitudinal direction of the car on the bottom surface, a float floatably contained in said float chamber, a needle valve capable of opening and closing a fuel inflow port to said float chamber in association with the movement of said float, a pair of partition walls arranged in parallel with each other in the bottom portion of said float chamber and positioned perpendicular to the longitudinal direction of the car, a rocking member rockably arranged in the space defined by said pair of partition walls and capable of contacting the lower surface of said float, and a ball capable of rolling on the bottom surface of said float chamber to rotate said rocking member, said float being pushed up by said rocking member rotated by said ball and said fuel inflow port being thereby forcibly closed with said needle valve when said float chamber inclines by an angle larger than a predetermined angle from its normal position.

7. A carburetor according to claim 6 wherein said ball is made of steel and said rocking member comprises a pair of plate-shaped portions rotatably mounted respectively on a pair of supporting shafts supported by said pair of partition walls and extending respectively in opposite directions, and a pair of lever portions integral with said respective plate-shaped portions and extending respectively in opposite directions, said plate-shaped portions being able to contact the bottom surface of said float chamber and said lever portions being able to contact the lower surface of said float.

8. A carburetor comprising a float chamber formed to be U-shaped as seen in the longitudinal direction of the car on the bottom surface, a float floatably contained in said float chamber, a needle valve capable of opening and closing a fuel inflow port to said float chamber in association with the movement of said float, a pair of partition walls arranged in parallel with each other in the bottom portion of said float chamber and positioned perpendicular to the longitudinal direction of the car, a rocking member rockably arranged in the space defined by said pair of partition walls and capable of contacting the lower surface of said float, and a roller capable of rolling on the bottom surface of said float chamber to rotate said rocking member, said float being pushed up by said rocking member rotated by said roller and said fuel inflow port being thereby forcibly closed with said needle valve when said float chamber inclines by an angle larger than a predetermined angle from its normal position.

9. A carburetor according to claim 8 wherein said roller is made of steel and said rocking member comprises a pair of plate-shaped portions rotatably mounted respectively on a pair of supporting shafts supported by said pair of partition walls and extending respectively in opposite directions, and a pair of lever portions integral with said respective plate-shaped portions and extending respectively in opposite directions, said plate-shaped portions being able to contact the bottom surface of said float chamber and said lever portions being able to contact the lower surface of said float.

* * * * *